United States Patent
Suveg et al.

(10) Patent No.: US 10,158,791 B2
(45) Date of Patent: Dec. 18, 2018

(54) CAMERA DEVICE WITH RED HALO REDUCTION

(71) Applicant: Robert Bosch GmbH, Stuttgart (DE)

(72) Inventors: Ildiko Suveg, Eindhoven (NL); Jan Klijn, Breda (DE); Martin Hartman, Eindhoven (NL); Rajesh Sreedharanpillai, Eindhoven (NL); Willibrordus Van der Poel, Veldhoven (NL)

(73) Assignee: Robert Bosch GmbH, Stuttgart (DE)

( * ) Notice: Subject to any disclaimer, the term of this patent is extended or adjusted under 35 U.S.C. 154(b) by 161 days.

(21) Appl. No.: 15/384,498

(22) Filed: Dec. 20, 2016

(65) Prior Publication Data
US 2017/0187929 A1  Jun. 29, 2017

(30) Foreign Application Priority Data
Dec. 23, 2015  (EP) .................................... 15202263

(51) Int. Cl.
*H04N 5/225* (2006.01)
*H04N 5/217* (2011.01)
(Continued)

(52) U.S. Cl.
CPC ........... *H04N 5/2173* (2013.01); *G02B 5/208* (2013.01); *H04N 5/2254* (2013.01); *H04N 5/33* (2013.01);
(Continued)

(58) Field of Classification Search
CPC .................................................... G02B 5/208
See application file for complete search history.

(56) References Cited

U.S. PATENT DOCUMENTS 7,137,708 B2 * 11/2006 Gupta .................... G02B 5/208
                                                              353/84
2004/0165694 A1 *  8/2004 Yonetani .............. G02B 21/362
                                                              378/5
(Continued)

FOREIGN PATENT DOCUMENTS

EP           710875          5/1996
EP          2744205          6/2014
(Continued)

OTHER PUBLICATIONS

Sunex, "IR cut-off filter", Apr. 10, 2014 and Nov. 15, 2014; http://www.optics-online.com/irc.asp?desc=reflective, 4 pages (Year: 2014).*

*Primary Examiner* — Gary C Vieaux
(74) *Attorney, Agent, or Firm* — Michael Best & Friedrich LLP

(57) ABSTRACT

Camera device 1 for taking at least one image of a scene in front of the camera device 1, the camera device 1 comprising: a sensor-camera 2 with a main beam path, whereby the sensor-camera 2 comprises a sensor 3, an IR filter 4 and an objective 5, whereby the IR filter 4 is arranged between the objective 5 and the sensor 3, whereby light with a wavelength smaller than a cut-off range passes the IR filter 4 into the sensor 3 and light with a wavelength larger than the cut-off range is reflected by the IR filter 4 and, whereby the main beam path is from the objective 5 into the sensor 3, whereby the objective 5 comprises a final optical element 7, whereby the final optical element 7 is the optical element next to the IR filter 4, whereby the IR filter 4 is tilted by a tilting angle, so that most of the reflected light or all of the reflected light is guided away from the final optical element 7.

15 Claims, 4 Drawing Sheets

(51) Int. Cl.
    *G02B 5/20*           (2006.01)
    *H04N 5/33*           (2006.01)
    *H04N 7/18*           (2006.01)
    *H04N 9/04*           (2006.01)
    *H04N 5/372*         (2011.01)

(52) U.S. Cl.
    CPC ............ *H04N 7/183* (2013.01); *H04N 9/045* (2013.01); *H04N 5/372* (2013.01)

(56) References Cited

U.S. PATENT DOCUMENTS

| | | | |
|---|---|---|---|
| 2005/0236553 A1 | 10/2005 | Noto et al. | |
| 2011/0316982 A1* | 12/2011 | Steurer | G03B 11/04 348/49 |
| 2012/0013765 A1* | 1/2012 | Maruyama | H04N 5/243 348/223.1 |
| 2012/0105594 A1* | 5/2012 | You | G01S 7/4811 348/49 |
| 2015/0334316 A1 | 11/2015 | Wang | |

FOREIGN PATENT DOCUMENTS

| | | |
|---|---|---|
| EP | 2846530 | 3/2015 |
| JP | 099114 | 1/1997 |
| WO | 2007071290 | 6/2007 |

* cited by examiner

CAMERA DEVICE WITH RED HALO REDUCTION

PRIOR ART

The invention relates to a camera device for taking at least one image of a scene in front of the camera device, the camera device comprising: a sensor-camera with a main beam path, whereby the sensor-camera comprises a sensor, an IR filter and an objective, whereby the IR filter is arranged between the objective and the sensor, whereby light with a wavelength smaller than a cut-off range passes the IR filter into the sensor and light with a wavelength larger than the cut-off range is reflected by the IR filter and, whereby the main beam path extends from the objective into the sensor, whereby the objective comprises a final optical element, whereby the final optical element is the optical element next to the IR filter.

IR cut filter are commonly used in color cameras to reduce the amount of IR light that would otherwise hamper color reproduction. In the past IR cut filter were absorptive filter. Absorptive filters have the drawback of losses greater than 3 dB in the visible light and are therefore leading to a sensitivity loss of the camera. To reduce this sensitivity loss, reflective IR filters were introduced. Such filters are made from multilayer coatings on glass. Although such reflective IR filters have a nearly ideal filter characteristic, the cut off edge in the wavelength is not infinitely steep and parts of the visible light around the cut off wavelengths are reflected as well.

To use rotatable polarization filters is known from document WO 2007/071290 A1. The document discloses a camera device for CCTV applications. The camera device comprises a lens for monitoring the scene in front of the camera device. At least one polarizer element is assigned to said sensor, the at least one polarizer element being rotatable mounted with respect to said sensor, or said polarizer element uses opto-electric effects.

SUMMARY OF THE INVENTION

The object of the invention is a camera device according to claim 1 and a video surveillance system according to claim 13. Preferred and advantageous embodiments of the invention are disclosed in the dependent claims, the subsequent description and the attached figures.

Subject-matter of the invention is a camera device. Such cameras devices are for example used for classical photographing, filming and in video surveillance systems like CCTV systems.

The camera device is adapted to take at least one image of a scene in front of the camera. In a preferred embodiment the camera takes a sequence of images. The camera device comprises a sensor-camera. The sensor-camera comprises a sensor, an IR filter and an objective, whereby the IR sensor is arranged between the objective and the sensor. The sensor-camera has a main beam path. The main beam path is the way, which most of visible light falling into the objective is going. The main beam path extends from the objective into the sensor.

The IR filter is adapted as a reflective filter. The IR filter has a cut-off range and/or a cut-off wavelength. Light with a wavelength smaller than the cut-off range passes the IR filter and follows the main beam path. Light with a wavelength larger than the cut-off range is reflected by the IR filter and the reflected light is not following the main beam path. Preferably the cut-off range is greater than 600 nm, in particular greater than 650 nm and especially greater than 700 nm. Typically filters and glasses are not ideal and therefore whether 100 percent transmission nor 100 percent reflection can be reached. In particular the IR filter is not an ideal filter and the transition from transmission to reflection is not infinitely steep, light with a wavelength around the cut-off wavelength is partly reflected and partly transmitted.

The objective comprises a final optical element. The final optical element is the element next to the IR filter. The final optical element has a front side and a rear side. The front site is the side facing the objective and thus the scene in front of the camera device. The rear side is the side facing the IR filter. The final optical element may be a lens. In particular the final optical element is made of transparent material.

According to the invention, the IR filter is tilted by a tilting angle, such that most of the reflected light and/or all of the reflected light, i.e. the light reflected by the IR filter, is guided away from the final optical element. Particularly, more than 80 percent of the reflected light is guided away from the final optical element. In particular the tilting angle is so large that less than 20 percent of the reflected light of an incoming parallel light beam hits the final optical element, therefor also no reflected light hits the any optical element in the objective.

The advantage of the invention is there is no or only a small amount of light reflected back onto the final adjacent lens and any optical element in the objective, hence ghost reflections are suppressed. Ghost reflections may occur if light reflected by the IR filter is also reflected by the final optical element or any optical element in the objective and then follows the main beam path and disrupt the image. With this invention ghost reflections will not disrupt the image.

In a preferred embodiment the magnitude of the tilting angle is defined by a reflected intensity. The light that is reflected by the IR filter has an reflecting intensity $I_{IR,R}$. Preferentially the reflected intensity is the intensity that is reflected by the IR filter into a two-pi-hemisphere. The tilting angle is adjusted that less than 20 percent of the reflected intensity $I_{IR,R}$ is reflected onto the final optical element. Especially, the intensity reflected onto the final optical element is defined as the intensity of all by the IR filter reflected light that could potentially be reflected by the final optical element back to the IR filter. In a further embodiment, the reflection intensity $I_{IR,R}$ is the intensity of reflected light in a set wavelength interval. In another embodiment the reflection intensity is the intensity of the reflected light with a wavelength larger than a set wavelength.

Preferably the camera device comprises a digital image processing unit. The digital image processing unit may be integrated in the camera device or may be an external digital image processing unit. The digital image processing unit applies a position-dependent variable gain to the red color of the taken image. The position-dependent variable gain may also depend on the objective of the camera device. The digital image processing unit may be adapted as an external personal computer. The digital processing unit may also be an integrated microprocessor.

Advantage of this embodiment of invention is that a color cast caused by a non-zero chief ray angle can be reduced. A non-zero chief ray angle causes a difference in the incident angle on left/right respectively up/down side of the filter. As the IR filter is slightly angle dependent a non-zero chief ray angle produce a color cast. The tilting angle and/or the position dependent variable gain in the red color may depend on the chief ray angle.

In a preferred embodiment the image taken by the camera devices comprises at least a red channel. In particular, the image is a RGB (Red Green Blue) image and has three channels, whereby the three channels are red, green and blue. The digital image processing unit applies a position-dependent gain in the red channel to the image. The position-dependent gain in the red channel may be a position dependent attenuation or a position-dependent amplification of the red channel.

Preferably the position-dependent gain in the red channel or red gain has a linear gradient. The linear gradient may be an one or two dimensional linear gradient. For example, the linear gradient in the position dependent gain in the red channel is a linearly increasing gain factor in the horizontal direction of the image. In particular the linear gradient is monotonous increasing or monotonous decreasing. The position dependent gain factor and its gradient are dependent on the chief ray angle of the sensor-camera, the tilting angle of the IR filter and the axis around which the IR filter is tilted. The linear gradient is along an axis that is perpendicular to the projection of the axis around which the IR filter is tilted on the plane of the sensor, whereby the direction of the projection is along the main beam path.

According to a special refinement of the invention, the camera device comprises an actuator unit, whereby the IR filter is mounted on the actuator unit. The actuator unit is adapted to move the IR filter in the main beam path and out of the main beam path. The actuator can be an electric motor, electroactive polymer or a piezoelectric actuator. Preferably, the actuator unit can slide and/or rotate the IR filter into the main beam path.

In a particularly preferred embodiment of the invention, the actuator unit is operable to replace the IR filter in the main beam path by transparent glass and or transparent plastics. Especially, the transparent glass and/or transparent plastics has especially the same shape and thickness as the IR filter but is not reflective. The replacement of the IR filter by a non-reflective material has the advantage that IR photons can be used at low light conditions for black and white images.

Furthermore, it is preferably provided that the camera device comprises a rotation unit, whereby the rotation unit is operable to change the tilting angle. Particularly the rotation unit is mounted on the actuator unit. For example, the rotation unit is an electric motor or a piezoelectric element. Preferably the rotation unit changes the angle by rotating the mirror around an axis. Alternatively the rotation unit changes the tilting angle with electrical adjusting screws. The camera device may comprise more than one rotation unit in order to tilt the IR filter around more than one axis. Advantage of this embodiment is that the tilting angle can be adapted if the chief ray angle is changed. This can be useful when the objective of the sensor-camera is changed from normal objective to wide angle objective.

It is considered to be expedient that the IR filter is flat and defines an IR plane. The objective defines an image plane. The tilting angle is then defined as the angle between the image plane and the IR plane. The intersection line can be real or virtual and can be inside or outside the camera device.

Particularly the tilting angle is larger than 10 degrees, preferably larger than 20 degrees and in special larger than 30 degrees. The tilting angle is smaller than 70 degrees. According to a special refinement of the invention the tilting angle is between 25 and 35 degrees. In this embodiment most of the reflected IR light misses the final optical element but is also very small to minimize optical aberrations like astigmatism, coma and lateral chromatic aberrations.

The IR filter comprises a substrate and an actual filter, whereby the actual filter material is deposit on the substrate. Particularly the substrate is glass or plastic. In order to reduce the optical aberrations anymore the IR filter is thinner than 500 micrometers, in particular thinner than 200 micrometer and especially thinner than 100 micrometers. Advantage of very thin IR filters is that optical aberrations like astigmatism, coma and lateral chromatic aberrations are suppressed.

In particular the thickness of the IR filter is linked to the tilting angle, whereby the thickness of the IR filter becomes bigger with increasing tilting angle. This is because the way which a transmitted light ray has to cover inside a certain IR filter increases with the tilting angle, and therefore also the absorption of light in the visible regime is also increasing with increasing tilting angle. For thicker IR filter there is therefore a larger tilting angle needed. In a special embodiment the tilting angle is less than 40 degrees, whereby the thickness of the IR filter is less than 1 millimeter and particularly less than 500 micrometer.

Another object of the invention is a super surveillance system comprising at least one camera device. Particularly the super surveillance system is a CCTV system. In a preferred embodiment the super surveillance system comprises only one camera device. In another embodiment the super surveillance system contains more the one camera systems. The super surveillance system may also contain usual cameras without a tilted IR filter. The super surveillance system has the advantages that no information loss in the monitoring area occurs due to ghost reflection

BRIEF DESCRIPTION OF THE FIGURES

Advantageous possible applications, goals, and features of the present invention will be described on the basis of the following description of an exemplary embodiment with reference to the drawing. In the schematic figures:

FIG. 1 shows a camera device 1 comprising a sensor-camera 2. The camera device can be used as a personal photo and/or video camera. It can also be used in CCTV systems or speed traps. In particular the camera devices is installed in a weatherproof housing. The sensor-camera 2 comprises a sensor 3, an IR filter 4 and an objective 5. The IR filter 4 is arranged between the sensor 3 and the objective 5. IR filter 4 is mounted in a bracket 6. The bracket 6 is connected with the sensor 3 to form an optical cavity.

Figure 1:
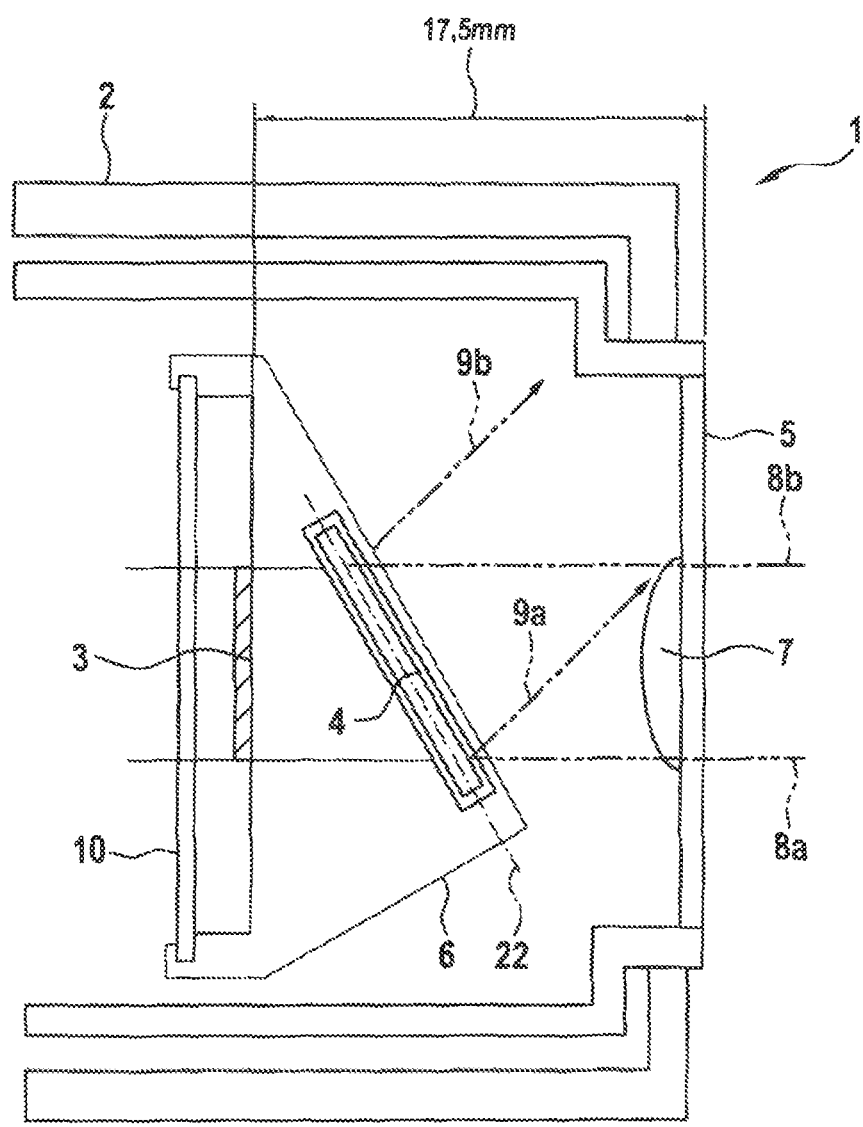
FIG. 1 shows a camera device in a side view as a first embodiment of the invention.

The objective 5 comprises a final optical element 7, whereby the final optical element is a lens. In other arrangements the final optical element may be a glass plate. The IR filter 4 is a reflective filter with a thickness of less than 0.1 millimeter and especially a thickness less than 0.05 millimeter. The IR filter 4 has a cut-off range, whereby light with a wavelength larger than the cut-off range is reflected by the IR filter 4. The cut of range may have a lower wavelength limit and an upper wavelength limit, whereby light with a wavelength smaller than the lower wavelength limit passes the IR filter 4 and light with a wavelength larger than the upper wavelength limit is reflected by the IR 4 filter. Light with a wavelength between the upper and lower wavelength limit is partly reflected and partly transmitted by the IR filter 4. The gap between upper and lower wavelength limit is less than 50 nanometer and especially less than 10 nanometer.

The main beam path is the way of incoming light with a wavelength smaller than the cut-off range. The main beam path goes from the objective 5 through the final optical element 7 and through the IR 4 filter into the sensor 3. Two incoming example IR light rays 8a and 8b with a wavelength larger than the cut-off wavelength are indicated in the figure. This incoming example IR light rays 8a and 8b are passing the objective 5 and are reflected by the IR filter according to the law of reflection, which states that the angle of incidence is equal to the angle of reflection. Therefore the reflected light rays 9a and 9b are also parallel.

The sensor 3 is a CCD or super CCD. The sensor 3 may alternatively be a CMOS sensor. The sensor 3 is mounted on a PCB (printed circuit board) 10, whereby the PCB 10 forms the rear of the optical cavity. The PCB 10 may be connected with an image processing unit. The image processing unit may be part of the camera device 1 or may be an external unit.

The sensor-camera 2 is operating with a C-mount. The C-mount limits the space between the objective 5 and the sensor 3 to at least 17.5 millimeter. Within this limited space it is very difficult to use more than one tilted IR filter to change IR filter parameters.

The IR filter 4 is tilted by a tilting angle. The tilting angle is the angle that is included by the image plane of the objective 5 and the plane in which the IR filter 4 lies. In this embodiment the tilting angle is 30 degrees. In particular the thing angle is larger than 10 degrees and smaller than 50 degrees. The tilting angle is so large that most of the reflected light is guided away from the final optical element 7. In particular a real or fictional incoming parallel beam 8a and 8b impinges the IR filter 4. The diameter of the parallel beam 8a and 8b is restricted by the aperture of the objective 5. The tilting angle is the so large that all reflected light beams 9a and 9b are not bounced back to the final optical element 7. Especially the tilting angle is so large that also peripheral rays 8a and 8b are guided away from the final optical element. Particularly, extremal light rays 8a are not reflected on the opposite boundary end 9a, whereby extremal light rays are a light rays that are passing an outer boundary end of the objective. With such a selected tilting angle no reflected light strikes the final optical element 7.

Figure 2:
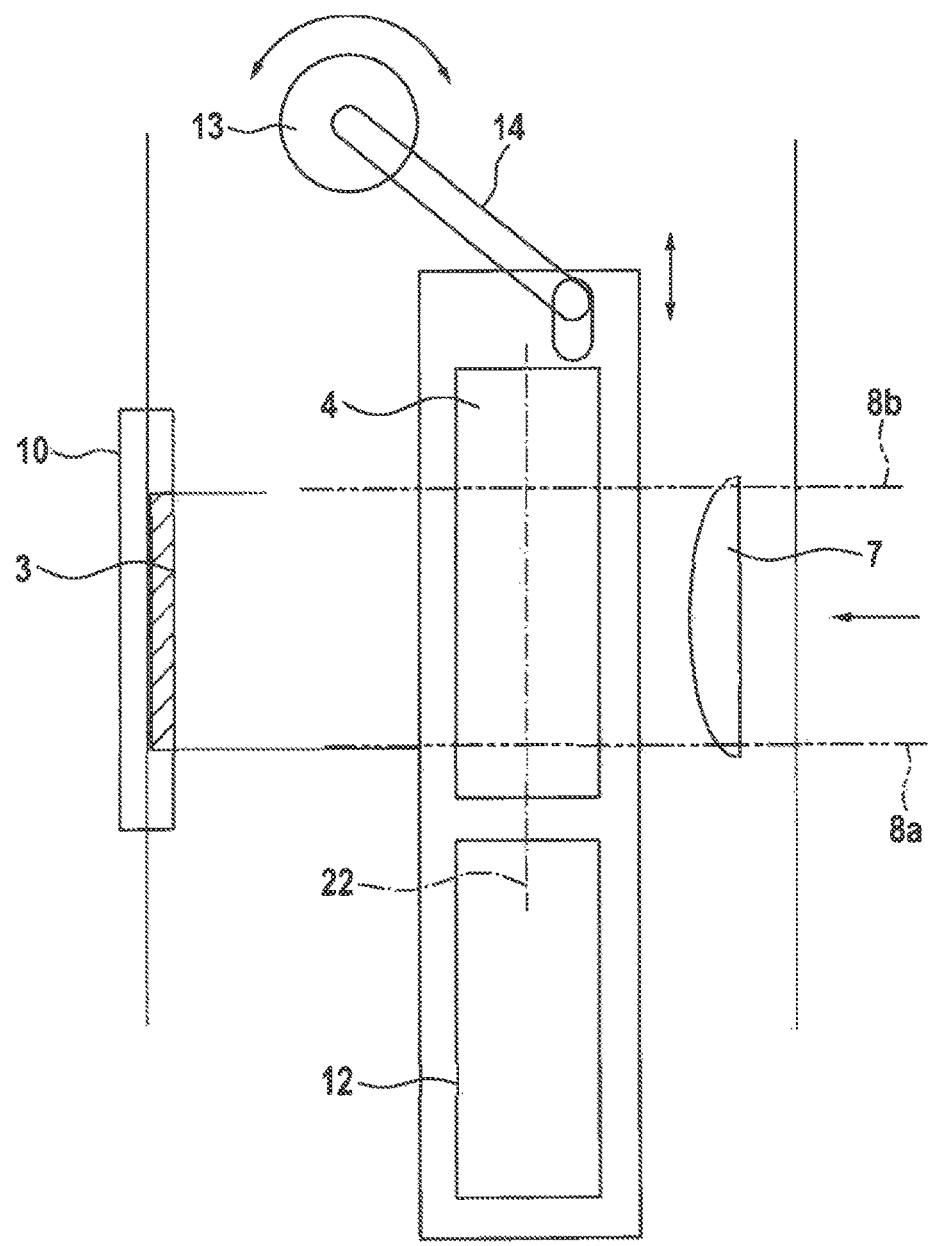
FIG. 2 shows the camera device of FIG. 1 in a view from above comprising an actor unit.

FIG. 2 shows a section of the camera device 1. It shows the final optical element 7, the IR filter 4, the sensor 3 and the PCB 10. The IR filter is tilted by a tilting angle, whereby the angle between the horizontal plane of the camera device and the IR filter is 30 degrees. The main beam path is from the final optical element 10 through the IR filter 4 into the sensor 3. Incoming light beams 8a and 8b are also shown in FIG. 2. Reflected light beams are not shown because they are reflected in the vertical and horizontal direction and cannot be distinguished from incoming light beams in the figure.

The sensor-camera 2 comprises a sliding unit as actuator, whereby the sliding unit comprises a holder and a moving unit. The holder has an elongated shape, whereby the IR filter 4 and a transparent glass 12 are mounted on the holder. The holder provides the tilting angle between IR filter 4 and final optical element 7. Particularly, the transparent glass 12 has the shape as the IR filter 4. Preferably, the area in which the transparent glass 12 lies and the area in which the IR filter 4 lies are parallel.

Light with a wavelength smaller than the cut-off range as well as light with a wavelength larger than the cut-off range can pass the glass 12. IR filter 4 and glass 12 are placed adjoining along the holder, so that either the IR filter 4 is in the main beam path or the glass 12 is in the main beam path.

The moving unit is actable to shift the holder along the longitudinal axis, whereby the longitudinal axis is an axis that is parallel to the longer sides of the holder. The moving unit comprises a motor 13 and a lever arm 14. The lever arm 14 connects the motor 13 with the holder. The lever arm 14 is pivotable connected with the holder 12 and unpivotable connected with the motor 13. A rotational movement of the motor 13 around the rotation axis of the motor leads to a rotation of the lever arm around the rotation axis of the motor. The rotation of the lever arm around the rotation axis of the motor and the pivotable connection of the lever arm can slight the IR filter in and out of the main beam path. Hence, the sliding unit is actable to replace the IR filter 4 in the main beam path by the glass 12. Advantage of the embodiment is that the changing between the glass 12 and the IR filter 4 in the main beam path enables the sensor-camera 2 to take pictures in bright and low light condition.

Figure 3:
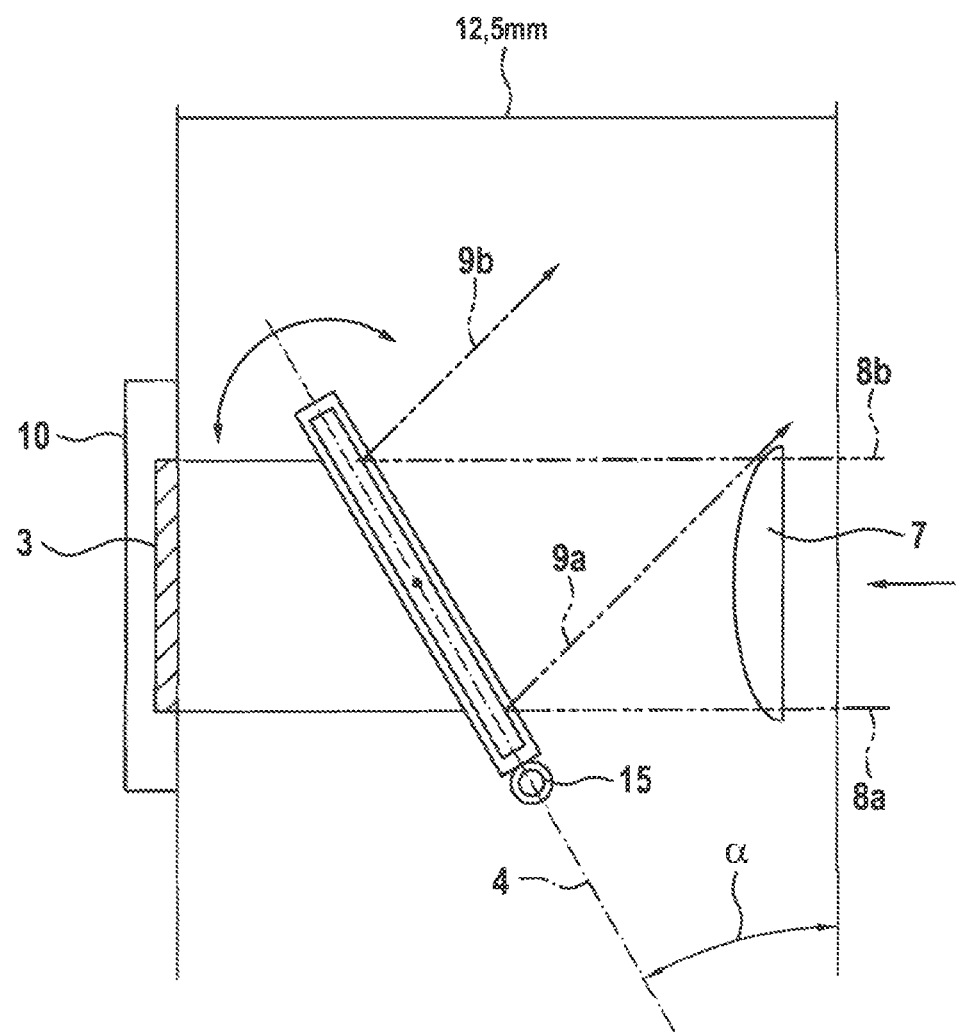
FIG. 3 shows a camera device in a side view comprising a rotation unit as a further embodiment of the invention.

FIG. 3 shows a section of the camera device 1 that contains a final optical element 7, an IR filter 4, a sensor 3 and a rotation unit 15. The rotation unit 13 comprises a holder and a motor. In particular the motor is a stepper motor. The IR filter 4 is mounted on the holder, whereby at normal operation the IR filter 4 is between the final optical element 7 and the sensor 3. The motor is operable to rotate the holder. The rotation of the holder changes the tilting angle and may be used to adjust the tilting angle e.g. after changing objective 5. The rotation unit 13 may also be used to rotate the IR filter 4 out of the main beam path.

The sensor-camera 2 is adapted with a CS-mount. The CS-mount limits the space between the final optical element 4 and the sensor 3 to a maximum of 12.5 millimeter. Because of space limitation there cannot be used more than one IR filter 4, but the rotation unit 15 is operable to change the tilting angle. The variation of the tilting angle correspondent in a variation of the parameter of the IR filter 4, for example in a variation of the cut-off wavelength and transmission index. The rotation unit 15 has the advantage that because of the changing of the tilting angle one IR filter 4 can be used for different recording parameters.

Figure 4:
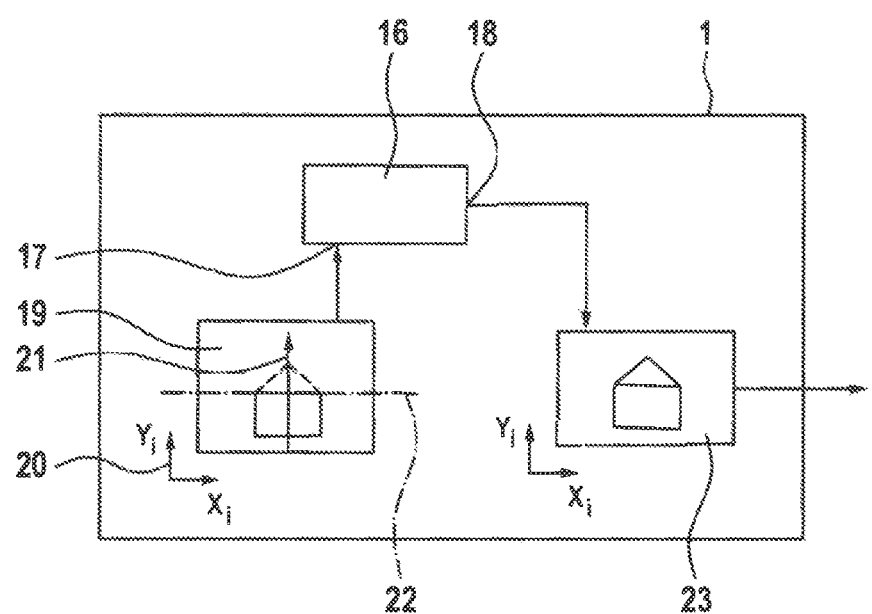
FIG. 4 shows a camera device comprising a digital image processing unit.

FIG. 4 shows a camera device 1 comprising a digital image processing unit 16. In this embodiment the digital processing unit 16 is integrated in the camera device 1. In another embodiment the digital image processing unit 16 may be an external unit. The digital image processing 16 unit can be realized as a computer chip, microcontroller or personal computer. The digital image processing unit 16 comprises an interface for data input 17 and an interface for data output 18. In a special refinement of the invention the interface for data input 17 and the interface for data output 18 may be the same.

The camera devices 1 takes at least one image 19 of a scene in front of the camera device 1. In particular, the image 19 is a digital image comprising a red channel. The digital image may be a RGB image (red green blue), a CMYK image (cyan magenta, yellow and black) or a HSV image (hue saturation value). The position inside the image 19 can be described by a coordinate system. In particular the position inside the picture 19 is described by a Cartesian coordinate system the Cartesian image coordinate system 20. The Cartesian image coordinate system has a x-axis ($x_i$) and an y-axis ($y_i$). In particular the $x_i$ of the Cartesian image coordinate system 20 correspond to the horizontal axis of the camera device 1 named $x_c$ and the $y_i$ of the Cartesian image coordinate system 20 correspond to the vertical axis of the camera device 1 named $y_c$.

The image 19 is provided to digital image processing unit 16. The digital image processing unit 16 applies a gain in the red color to the picture 19, whereby the gain in the red color is variable and depend on the position inside the image 19. Particularly the gain in the red color varies from a gain <1 to a gain >1. Especially, the gain in the red color can directly applied to the red channel of the digital image.

The gain in the red color has a linear gradient in at least one direction of the image. The strength of the linear gradient depend on the absolute value of the tilting angle and the chief ray angle. The direction of the linear gradient depend on the direction of the axis around which the IR filter 4 is tilted. The linear gradient is parallel to the $x_i$ axis, if the IR filter 4 is tilted around the $y_c$ axis. The linear gradient is parallel to the $y_i$ axis, if the IR filter 4 is tilted around the $x_c$ axis.

More general the linear gradient is parallel to a gradient axis 21, whereby the gradient axis is determined by the axis around which the IR filter 4 is tilted. The IR filter is tilted around a tilting axis 22. The tilting axis 22 can be described in the $x_c$-$y_c$ coordinate system. Since the Cartesian image coordinate system 20 correspond to the $x_c$-$y_c$ coordinate system the tilting axis 22 can be transferred and described in the Cartesian image coordinate system 20. The gradient axis 21 is computed as an axis that is perpendicular to the transferred tilting axis 22.

After applying the position dependent variable gain in the red channel to the image 20, the digital image processing unit provide a color corrected image 23. The color corrected image 23 is provided as a digital image through the interface for data output 18. The data output 18 can feed out of the camera device 1.

The invention claimed is:

1. A camera device (1) for taking at least one image (20) of a scene in front of the camera device (1), the camera device (1) comprising:
   a sensor-camera (2) with a main beam path, wherein the sensor-camera (2) comprises a sensor (3), an IR filter (4), an objective (5), and a digital image processing unit, wherein the digital image processing unit applies an image position-dependent variable gain to the red color to the image,
   wherein the IR filter (4) is arranged between the objective (5) and the sensor (3), wherein light with a wavelength smaller than a cut-off range passes the IR filter (4) into the sensor (3) and light with a wavelength larger than the cut-off range is reflected by the IR filter (4) and,
   wherein the main beam path extends from the objective (5) into the sensor (3),
   wherein the objective (5) comprises a final optical element (7), wherein the final optical element (7) is the optical element next to the IR filter (4), and
   wherein the IR filter (4) is tilted by a tilting angle, so that most of the reflected light or all of the reflected light is guided away from the final optical element (7).

2. The camera device (1) according to claim 1, wherein most of the reflected light is more than 80 percent of the reflected light.

3. The camera device according to claim 1, wherein the light which is reflected by the IR filter (4) has a reflection intensity ($I_{IR,R}$), wherein less than 20 percent of the reflection intensity ($I_{IR,R}$) is bounced back to the final optical element (7).

4. The camera device (1) according to claim 1, wherein the position-dependent variable gain in the red color has a linear gradient in at least one direction of the image (20) taken by the camera device (1).

5. The camera device (1) according to claim 1, wherein the image (20) taken by the camera device (1) comprises at least a red color channel and that the camera device (1) comprises a digital image processing unit (16), wherein the digital image processing unit applies (16) an image position-dependent variable gain in the red channel to the image (20).

6. The camera device (1) according to claim 5, wherein the position-dependent variable gain in the red channel has a linear gradient in at least one direction of the image (20) taken by the camera device (1).

7. The camera device (1) according to claim 1, wherein camera device (1) comprises an actuator unit, wherein the IR filter (4) is mounted on the actuator unit and wherein the actuator unit moves the IR filter (4) in the main beam path and out of the main beam path.

8. The camera device (1) according to claim 7, wherein the actuator unit is operable to replace the IR filter (4) in the main beam path by transparent glass (12).

9. The camera device (1) according to claim 7, wherein the actuator unit is operable to replace the IR filter (4) in the main beam path by transparent plastics.

10. The camera device (1) according to claim 7, wherein the actuator unit is operable to replace the IR filter (4) in the main beam path by transparent glass (12) and transparent plastics.

11. The camera device (1) according to claim 1, wherein the camera device (1) comprises a rotation unit (15) for changing the tilting angle.

12. The camera device (1) according to claim 1, wherein the IR filter (4) is flat and defines an IR plane and the objective defines an image plane, wherein the tilting angle is defined as the angle between the image plane and the IR plane.

13. The camera device (1) according to claim 12, wherein the tilting angle is between 25 and 35 degrees.

14. The camera device (1) according to claim 1, wherein the IR filter (4) is thinner than 200 micrometers.

15. A video surveillance system comprising a camera device (1) according to claim 1.

* * * * *